US008671040B2

(12) United States Patent
Roser et al.

(10) Patent No.: US 8,671,040 B2
(45) Date of Patent: Mar. 11, 2014

(54) CREDIT RISK MINING

(75) Inventors: Ryan D. Roser, Portland, OR (US); George P. Bonne, San Jose, CA (US)

(73) Assignee: Thomson Reuters Global Resources, Baar (CH)

( * ) Notice: Subject to any disclaimer, the term of this patent is extended or adjusted under 35 U.S.C. 154(b) by 338 days.

(21) Appl. No.: 12/842,440

(22) Filed: Jul. 23, 2010

(65) Prior Publication Data
US 2012/0023006 A1 Jan. 26, 2012

(51) Int. Cl.
*G06Q 40/00* (2012.01)
*G06F 17/00* (2006.01)
*G06Q 10/06* (2012.01)

(52) U.S. Cl.
CPC ............... *G06Q 40/00* (2013.01); *G06F 17/60* (2013.01); *G06Q 10/0635* (2013.01)
USPC ........................................... 705/35; 705/7.28

(58) Field of Classification Search
CPC ..... G06Q 40/00; G06Q 10/0635; G06F 17/60
USPC .................................................. 705/35, 7.28
See application file for complete search history.

(56) References Cited

U.S. PATENT DOCUMENTS

| | | | | |
|---|---|---|---|---|
| 7,363,243 | B2 * | 4/2008 | Arnett et al. ................ | 705/7.31 |
| 7,406,452 | B2 * | 7/2008 | Forman et al. ................ | 706/20 |
| 7,937,397 | B2 * | 5/2011 | Pickens ........................ | 707/750 |
| 7,987,188 | B2 * | 7/2011 | Neylon et al. ................ | 707/739 |
| 2003/0088433 | A1 * | 5/2003 | Young et al. .................. | 705/1 |
| 2003/0135445 | A1 * | 7/2003 | Herz et al. .................... | 705/37 |
| 2003/0187772 | A1 * | 10/2003 | Papka ........................... | 705/36 |
| 2004/0044505 | A1 | 3/2004 | Horwitz | |
| 2005/0071217 | A1 * | 3/2005 | Hoogs et al. .................. | 705/10 |
| 2006/0085325 | A1 | 4/2006 | Jammal et al. | |
| 2006/0089924 | A1 * | 4/2006 | Raskutti et al. ................ | 707/1 |
| 2006/0206479 | A1 * | 9/2006 | Mason .......................... | 707/5 |
| 2009/0313041 | A1 | 12/2009 | Eder | |
| 2010/0010968 | A1 | 1/2010 | Redlich et al. | |

OTHER PUBLICATIONS

Kotsiantis, S. et al., "Efficiency of Machine Learning Techniques in Bankruptcy Prediction", 2nd International Conference on Enterprise Systems and Accounting (ICESAcc '05) Jul. 11-12, 2005, Thessaloniki, Greece, pp. 39-49.
Shin, K. et al., "An application of support vector machines in bankruptcy prediction model", Elsevier, Expert Systems with Applications 28 (2005) 127-135.
"Bankruptcy Prediction Models", BankruptcyAction.com, pp. 1-5, http://www.bankruptcyaction.com/insolart1.htm.

(Continued)

*Primary Examiner* — Kirsten Apple
*Assistant Examiner* — Scott S Trotter
(74) *Attorney, Agent, or Firm* — Bartholomew DiVita; Thomson Reuters

(57) ABSTRACT

Systems and techniques for developing and implementing a credit risk model using various sources of data, including price data, financial accounting ratios, ESG (Environmental, Social and Governance) data, and textual data are disclosed. Each source of data provides unique and distinct information about the health of an entity, such as a firm or company. The systems and techniques combine information from disparate sources to create a uniquely powerful signal. The systems and techniques can be used to predict a number of events including, but not limited to, probability of default or bankruptcy, loss given default, probability of rating agency rating change, and probability of equity price moves.

19 Claims, 3 Drawing Sheets

(56) References Cited

OTHER PUBLICATIONS

He Yihong et al.: "An empirical evaluation of bankruptcy prediction models for small firms: an over-the-counter market experience" Money Watch, pp. 2-15, http://findaricles.com/p/articles/mi_hb6182/is_1_9/ai_n29241532/pg_12/?tag=content;col1.

"A Model of Bankruptcy Prediction", DefaultRisk.com, pp. 1-2, http://defaultrisk.com/pp_score_20.htm.

Kloptchenko, A. et al., "Mining Textual Contents of Financial Reports", The International Journal of Digital Accounting Research, vol. 4, N. 7, 2004, pp. 1-29.

"Kalman Filter", Wikipedia, pp. 1-21, http://en.wikipedia.org/wiki/Kalman_filter.

"The Kalman Filter", pp. 1-6, http://www.cs.unc.edu/~welch/kalman/index.html.

Lu Hsin-Min et al.: "Risk Statement Recognition in News Articles", Thirtieth International Conference on Informatiion Systems, Phoenix, Arizona 2009, pp. 1-16.

International Search Report and Written Opinion of the International Searching Authority, issued in the corresponding PCT International Application, Oct. 27, 2011.

\* cited by examiner

CREDIT RISK MINING

TECHNICAL FIELD

The invention relates to risk management, and more particularly to systems and techniques for predicting credit risk.

BACKGROUND

Risk management has been a topic of researchers for many years and is an important issue for business professionals. Risk management can help business professionals identify important adverse future events an entity, such as a firm, may face and help establish procedures to measure, mitigate and manage risk. For those investors extending credit to entities, risk management can help investors assess potential losses resulting from such activity. Likewise, for investors who hold an equity interest in entities, risk management can help investors assess potential volatility affecting those investments and adjust their portfolios accordingly.

Typically, a broad range of data sources are utilized in risk management. Many of these data sources are derived directly from public data sources including companies. For example, many researchers have developed credit risk models that rate companies based on their likelihood of defaulting on their debt or loans using financial accounting data, such as accounting ratios, and pricing data from pricing services, such as Moody's, S&P and Fitch. Example metrics computed in credit risk models include a probability of default (e.g., the likelihood that an entity will fail to meet its financial obligations), and loss given default (e.g., if a default occurs, the amount those who extended credit to the entity expect to lose).

While such sources of information provide valuable input to the credit risk modeling process, there is a vast amount of publicly available information that is overlooked by these models. For example, textual based data sources such as news articles that report on a firm's past, current, and possible future events typically include important information that is not considered in the credit risk modeling process. Further, the semantic context of text included in these data sources is typically not analyzed by these processes.

Accordingly, there is a need for improved credit risk modeling techniques that are capable of analyzing not only financial accounting ratios and pricing information, but also textual-based information.

SUMMARY

Systems and techniques for developing and implementing a credit risk model using various sources of data, including price data, financial accounting ratios, ESG (Environmental, Social and Governance) data, and textual data are disclosed. Each source of data provides unique and distinct information about the health of an entity, such as a firm or company. The systems and techniques combine information from disparate sources to create a uniquely powerful signal. The systems and techniques can be used to predict a number of events including, but not limited to, probability of default or bankruptcy, loss given default, probability of rating agency rating change, and probability of equity price moves.

Various aspects of the invention relate to assigning objective descriptors and feature vectors to a set of historical documents, determining a relationship between the objective descriptors and feature vectors, and using the relationship to assign predictive descriptors to a set of different documents.

For example, according to one aspect, a method of determining credit risk of a company includes assigning an objective descriptor to each document included in a first set of documents, the objective descriptor based on a historical event or a quantitative metric. The method includes assigning at least one feature vector to each document in the first set of documents, the at least one feature vector being an N-dimensional vector of numerical features each representing identified textual content, identified semantic content, or combination thereof, and determining a relationship between a plurality of assigned objective descriptors and a plurality of assigned feature vectors. The method also includes assigning a predictive descriptor to each document of a second set of documents not included in the first set of documents based on the relationship, the predictive descriptor indicative of a future event relating to at least one of a company default, company bankruptcy, loss given default, credit spread, rating agency rating change, and equity price movement. The method further includes generating a signal based on at least one predictive descriptor of the second set of documents.

In one embodiment, the method includes generating the at least one feature vector based on textual content, metadata or an indicator associated with the document. The method can include selecting randomly a pre-determined number of documents from the first set of documents to form a plurality of subsets of documents, each document in the plurality of subsets including the at least one feature vector and an associated first label value or an associated second label value different from the first label value, computing a metric value for each feature of the at least one feature vector by determining if the feature describes the associated first label value or the associated second label value, and computing a rank value for each feature of each subset by aggregating a plurality of computed metric values for each feature across the plurality of subsets.

The method can also include comparing the computed rank value to a pre-determined threshold value and, based on the comparison, providing a feature vector comprising a plurality of ranked features and the associated first label value or the associated second label value to a machine learning module to determine the relationship.

In another aspect, a method includes assigning a predictive descriptor to a first document, the predictive descriptor indicative of a future event relating to at least one of a company default, company bankruptcy, loss given default, credit spread, rating agency rating change, and equity price movement, and generating an entity credit risk signal based on the predictive descriptor. In one embodiment, the predictive descriptor is based on determining a relationship between a first training document and a second training document.

The method can also include assigning an objective descriptor to the first training document and the second training document, the objective descriptor based on a historical event or a quantitative metric, and assigning at least one feature vector to the first training document and the second training document, the at least one feature vector being a numerical representation of identified textual content, identified semantic content, or combination thereof.

In another aspect, a device includes means for assigning a predictive descriptor to a first document, the predictive descriptor indicative of a future event relating to at least one of a company default, company bankruptcy, loss given default, credit spread, rating agency rating change, and equity price movement. The device also includes means for generating an entity credit risk signal based on the predictive descriptor.

In one embodiment, the predictive descriptor is based upon a first training document, the first training document having a corresponding first objective descriptor and a corresponding first stored numerical representation, the corresponding first objective descriptor and the corresponding first stored numerical representation having a first predefined relationship. The predictive descriptor can also be based on a second training document. The second training document includes a corresponding second objective descriptor and a corresponding second stored numerical representation having a second predefined relationship.

In yet another aspect, a system includes a data store including a first set of documents and a second set of documents, and a server including a processor and memory storing instructions that, in response to receiving a request for access to a service, cause the processor to assign a predictive descriptor to a first document of the second set of documents, the predictive descriptor indicative of a future event relating to at least one of a company default, company bankruptcy, loss given default, credit spread, rating agency rating change, and equity price movement. The predictive descriptor is based on a relationship between a plurality of documents in the first set of documents. The processor of the system generates an entity credit risk signal based on the predictive descriptor.

Additional systems, methods, as well as articles that include a machine-readable medium storing machine-readable instructions for implementing the various techniques, are disclosed. Details of various implementations are discussed in greater detail below.

BRIEF DESCRIPTION OF THE DRAWINGS

Like reference symbols in the various drawings indicate like elements.

DETAILED DESCRIPTION

Figure 1:
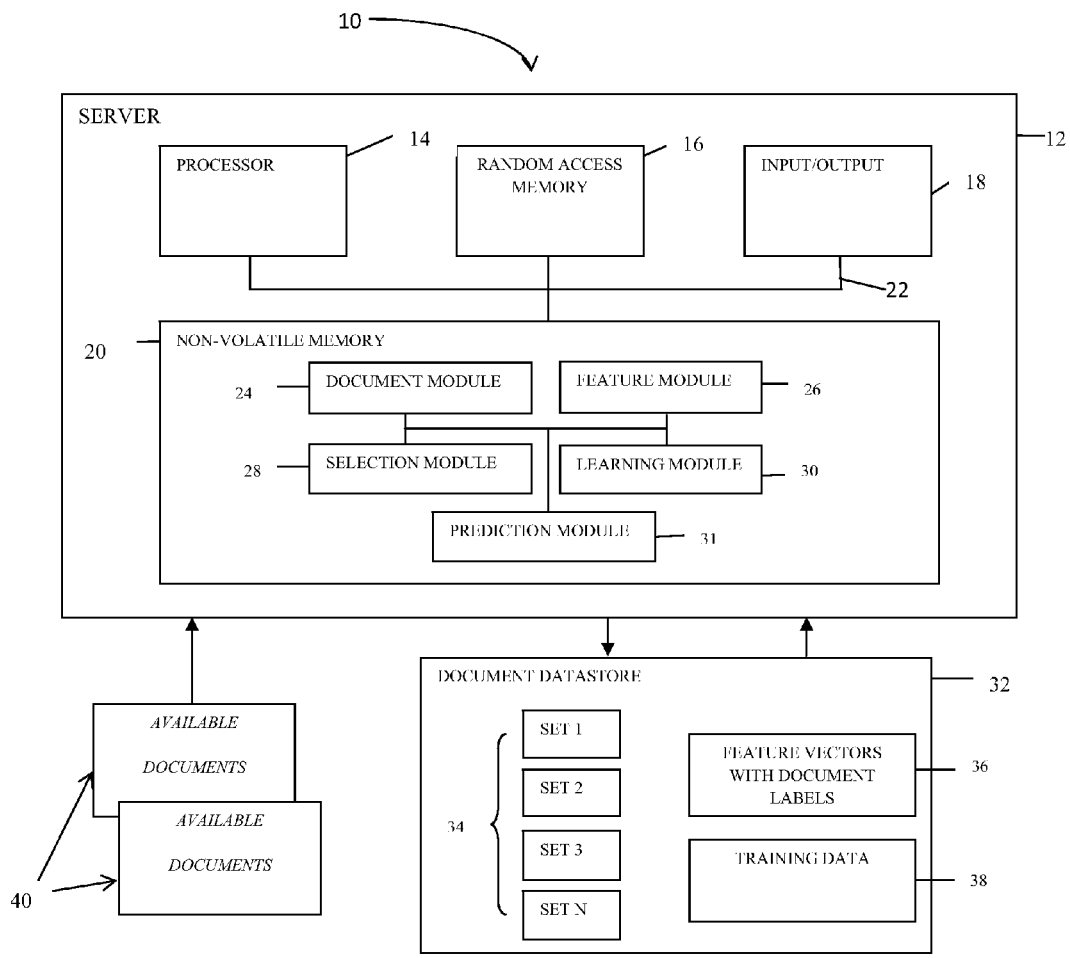
FIG. 1 is a schematic of an exemplary computer-based credit risk mining system.

FIG. 1 shows a computer-based system 10 for analyzing credit risk associated with an entity, such as a company or firm. The system 10 is configured to analyze financial accounting ratios, pricing data, as well as textual-based data included in documents using one or more text mining components. Advantageously, the system 10 can be used to predict a number of items relating to an entity, such as a probability of default or bankruptcy, a loss given default, a probability of rating agency (e.g., S&P, Moody's, Fitch) rating change, and a probability of large equity price movement.

As shown in the FIG. 1 example, the system 10 includes a server device 12 configured to include a processor 14, such as a central processing unit ('CPU'), random access memory ('RAM') 16, one or more input-output devices 18, such as a display device (not shown) and keyboard (not shown), and non-volatile memory 20, all of which are interconnected via a common bus 22 and controlled by the processor 14. In one embodiment, as shown in FIG. 1, the non-volatile memory 20 is configured to include a document module 24 for assigning objective descriptors to documents, each objective descriptor including a document label, a feature module 26 for extracting feature vectors from labeled documents, a selection module 28 for ranking feature vectors by relevancy, a learning module 30 for determining a relationship between a plurality of objective descriptors and assigned feature vectors, and a prediction module 31 for generating a signal based on at least one predicative descriptor assigned to a document. The predictive descriptor is indicative of a future event for an entity and is based on identified textual content of a document, identified semantic context of text in a document, or a combination thereof. Additional details of the document module 24, the feature module 26, the selection module 28, the learning module 30, and the prediction module 31 (collectively "text mining modules") are discussed in greater detail below.

The system 10 can be configured to include an access device (not shown) that is in communication with the server device 12 over a network. The access device can include a personal computer, laptop computer, or other type of electronic device, such as a cellular phone or Personal Digital Assistant (PDA). In one embodiment, for example, the access device is coupled to I/O devices (not shown) that include a keyboard in combination with a pointing device such as a mouse for sending requests to the server 12. Preferably, memory of the access device is configured to include a browser that is used to request and receive information from the server 12 over the network.

The network can include various devices such as routers, server, and switching elements connected in an Intranet, Extranet or Internet configuration. In some implementations, the network uses wired communications to transfer information between the access device and the server device 12. In another embodiment, the network employs wireless communication protocols. In yet other embodiments, the network employs a combination of wired and wireless technologies.

The text mining modules 24, 26, 28, 30, 31 are adapted to process data from various sources. For example, in one embodiment, one or more text mining modules 24, 26, 28, access and process the unique and timely sources of textual data available from Thomson Reuters, such as conference call transcripts from the Thomson Reuters StreetEvents data feed, and news articles and headlines from the Reuters NewsScope Archive. Companies' annual and quarterly financial statements and broker research documents can also be accessed and processed by the one or more text mining modules 24, 26, 28, 30, 31.

In one embodiment, the text mining modules 24, 26, 28, 30, 31 are configured in the non-volatile memory 20 of server device 12 and implement a "bag of words" technique in processing textual data. For example, in one embodiment, the document module 24 processes textual data as a collection of words and phrases with relatively little significance given to the location of words or phrases within the document or the grammatical and linguistic characteristics of the text. In another embodiment, the document module 24 is configured to access feature vectors and indicators derived from the text of documents by third parties, such as by ClearForest. The derived indicators are based on linguistic properties of the text being analyzed and provide semantic context to text of documents.

Document datastore 32 is a repository that is utilized by one or more text mining modules 24, 26, 28, 30, 31 to access and store information relating to one or more received documents 40, one or more sets of documents 34, feature vectors and labels 38 associated with one or more documents, and training data 38 used by the learning module 30. In one embodiment, the document datastore 32 is a relational database. In another embodiment, the document datastore 32 is a directory server, such as a Lightweight Directory Access Protocol ('LDAP') server. In yet other embodiments, the data store 32 is a configured area in the non-volatile memory 20 of the device server 12. Although the data store 32 shown in FIG. 1 is connected to the server 12, it will be appreciated by one skilled in the art that the document data store 32 can be distributed across various servers and be accessible to the server device 12.

The document module 24 organizes historical textual-based documents into one or more sets of textual data. For example, in one embodiment, the document module 24 organizes and analyzes conference call transcripts, news articles, financial statements, broker research publications, online publications such as blogs and tweets, and other textual-based data sources. The document module 24 processes each text-based document as a unique observation. In one embodiment, the document module 24 aggregates a plurality of documents together and processes them as a single document. For example, in one embodiment, the document module 24 processes all documents relating to an entity over a certain time period (e.g., a day, week, month, etc.) as one document. As used herein the word "document" includes a single document and/or a bundle of documents and/or a portion of a single document, or a combination thereof. The document module 24 can also be configured to only process specific sections of the documents, or to process certain portions of the documents differently. For example, in one embodiment, the document module 24 analyzes the Management Discussion portion of a conference call transcript differently than the Question and Answer portion of the conference call transcript.

The document module 24 assigns each document an "as of date", indicating a date upon which the document is available. In one embodiment, this is the date that the document first became accessible to users or clients through a data feed or data delivery platform providing the document. In addition, the document module 24 associates each document with one or more companies. In one embodiment, the document module 24 determines company associations based on metadata provided along with each document. In another embodiment, the document module 24 searches textual content of the document for entity names, company tickers, or entity identifiers included in the document, and then compares the search result information to pre-identified entity identifiers.

The document module 24 uses the company and date assignments to construct one or more training sets of labeled documents. The document module 24 labels each document of a set of documents as being "positive" (e.g., indicative of the event) or "negative" (e.g., not indicative of the event). For example, in one embodiment, upon seeking to predict bankruptcies and defaults for an entity within 12 months of a document's arrival, the document module 24 sets a label value of the document to a "positive" value for each previously received document of a set if the entity associated with the document has a default or is in bankruptcy twelve (12) months following the "as of date" of the document. If the entity associated with the document does not have a default and is not in bankruptcy in the 12 months following the "as of date" of the document, the document module 24 sets the label value for the document to a "negative" value.

The document module 24 can set multiple labels for each document if the goal is to predict multiple items. For example, one label can be indicative of a future bankruptcy or default and a second label can be indicative of a future large equity price drop. Alternatively, in another embodiment, the document module 24 sets a single label to predict multiple events. For example, in one embodiment, the document module 24 sets one label to indicate both a future bankruptcy or default and a future large equity price drop.

In one embodiment, for example, the document module 24 generates and assigns an objective descriptor to each document by associating the before-mentioned "as of date", entity identifier, and label value to each document. In another embodiment, the document module 24 assigns an objective descriptor to each document based on a quantitative metric. For example, the quantitative metric can be based on a sentiment rating, a tone rating, a corporate event indicator, a linguistic analysis indicator, a statistical analysis indicator, or combination thereof. In one embodiment, the linguistic analysis indicator relates to the structure or grammar of words (e.g., noun phrases) included in the document. In another embodiment, the statistical analysis indicator relates to the frequency of words in the document.

In some instances a document can reference more than one entity. For example, a technology news article may discuss both Microsoft Corporation and Apple Computers, Inc. When this occurs, the document module 24 is configured to use semantic and statistical information derived from the text of the document to identify the relevance of the document to each different company. For example, if the before-mentioned technology news article primarily discusses the release of a new operating system by Microsoft Corporation and then briefly describes how the new operating system may decrease Apple's market share, the document module 24 determines that seventy percent (70%) of the article is relevant to Microsoft Corporation and that thirty percent (30%) of the article is relevant to Apple Computers, Inc. In one embodiment, the document module 24 assigns one objective descriptor to the document for each entity identified in the article. The document module 24 sets the date value of the objective descriptor to a constant value and the entity identifier is set to correspond to each company identified in the document. Further, in one embodiment, the document module 24 is configured to modify the label of the document as a function of the document's relevance to the corresponding entity.

The feature module 26 represents each document as a set of feature vectors. As used herein, the phrase "feature vectors" refers to an N-dimensional vector or array of numerical features each representing identified textual content, identified semantic content, or combination thereof, included in each document. The feature vectors are derived from the text of the document itself. The feature module 26 can generate feature vectors from documents that include metadata or indicators derived from the text. For example, a document can be assigned a "sentiment" rating (positive, neutral, or negative), a "tone" rating (positive, negative, or neutral), indicators representing discussion of corporate events such as mergers or acquisitions, or other types of indicators derived from linguistic or statistical analysis of the document text as a whole, as described previously in connection with the document module 24. These indicators can be generated by third parties, such as ClearForest or by the feature module 26 itself. The feature module 26 also can be configured to create features based on the individual word and phrases within each document.

For example, in one embodiment, the feature module 26 divides a document into words and phrases (k-mers/n-grams) of a few words in length. The feature module 26 extracts all consecutive words and phrases three or fewer words long. The feature module 26 then removes punctuation and pure numerical strings.

In one embodiment, the feature module 26 uses a "stop-word list" to removing specific words that are deemed irrelevant. Common stop-words include words such as "the", "and", "a" and so on. The feature module 26 can also be configured to use additional stop words based on lists of proper nouns, person, company or entity names, company or industry specific terminology, the statistical properties of the words found in the document datastore, or custom lists generated by analysts or experts. The feature module 26 is also configured to remove words that are irrelevant or non-robust words that may correlate with event or time period specific factors.

In one embodiment, the feature module 26 places requirements on the length of the words, including words that are between two (2) and twenty (20) characters in length and removes all other words. Advantageously, this has the effect of limiting feature vectors to typical words and phrases and removing garbled text. The feature module 26 can also be configured to stem (a process for reducing inflected and/or derived words to their stem, base or root form) all words in the document. In one embodiment, for example, the feature module 26 stems words of a document using a stemming algorithm, such as Porter stemmer as known in the art, to remove tense, inflection, and pluralities in words.

Once the feature module 26 generates feature values, the selection module 28 determines which of the features are most predictive. The selection module 28 evaluates the predictive power of each feature independently, using one or more statistical metrics or tests as described below. As such, the selection module 28 eliminates noisy or irrelevant features. The selection module 28 can also be configured to eliminate very rare features, namely, features that occur in only a very small number or fraction of documents.

The selection module 28 selects the most informative features by repeatedly examining different subsets 34 of available documents. The selection module 28 randomly selects a subset of documents from the set of all available documents 34, selecting some documents from a set of positively labeled documents and some documents from a set of negatively labeled documents. In one embodiment, the subsets of documents are balanced, that is each subset has a same number of positive and negative documents. Alternatively, one or more subset can be unbalanced, that is having a different number of positive and negative documents. As used herein, this subset of documents is also referenced to as a "corpus". In one embodiment, the selection module 28 selects a balanced corpus that contains approximately one-third (⅓) of the positive documents and an equal number of negative documents.

As described previously, the selection module 28 evaluates the predictive power of each feature in a corpus. The selection module 28 first eliminates any features that do not occur in a minimum number of documents in the corpus. For example, in one embodiment, the selection module 28 eliminates any features that do not occur in at least one percent (1%) of the corpus documents. In doing this, the selection module 28 eliminates any very rare features, which are typically noisy and unreliable indicators. Example rare features include an individual first and last name. The selection module 28 then evaluates each remaining feature using one or more statistical metrics or tests, such as Accuracy, Recall, Precision, Information Gain, Bi-normal Separation, or other metrics. These metrics measure the feature's ability to distinguish between the positive and negative labeled documents in the corpus.

The selection module 28 repeats the above-described process several times, repeatedly creating a randomly selected corpus and measuring the performance of the features in the corpus. Typically, the selection module 28 creates a larger number of corpora if the total set of documents is very imbalanced (e.g., if the set has many more positive labeled documents than negative labeled documents). The selection module 28 samples the entire collection of documents using many small subsets of documents. For example, in one embodiment, between fifty (50) and two hundred (200) corpora are established. By repeatedly creating a randomly selected corpus, it is possible that a first document of the total set of documents is selected for multiple corpora, and that a second document of the total set of documents is not selected for any of the corpora.

Upon scoring the features in each corpus, the selection module 28 computes an aggregate performance for each feature across all of the corpora. In one embodiment, the selection module 28 calculates the average of the corpus scores for each feature. The selection module 28 then selects the final features by choosing the ones with the highest aggregate score. In one embodiment, the selection module 28 requires that the feature be highly scored in a minimum number of corpora (e.g., the feature is among the top one-thousand (1000) features in twenty percent (20%) of the corpora) to ensure that the feature is often a strong performer. The number of final features included by the selection module 28 can be set at a specific cutoff. For example, in one embodiment, the selection module 28 selects the top two hundred and fifty (250) features with the highest aggregate scores and that meet all the criteria above. Advantageously, this cutoff can be based on the robustness of the final performance and can be determined by the predictive ability of a machine learning algorithm trained on the feature vectors, as described in further detail below. The selection module 28 is configured to select as few features as possible while maximizing the ability to detect bankruptcies and defaults or other events.

In addition, the selection module 28 can apply clustering algorithms (e.g., hierarchical clustering or k-means clustering) or dimensional reduction algorithms (e.g., principal component analysis (PCA) or non-negative matrix factorization (NMF)) to the features to reduce or condense the number of available features into a set of additional features. The selection module 28 can apply these technique either prior to the process described above, after the above process, or independent from the above process.

The selection module 28 provides the final features in the feature vectors to the learning module 30, with an element in each vector corresponding to one of the final features. The numerical representation of the feature can be a binary value (e.g., Value='1' if a particular feature exists in the document or value='0' if the particular feature is absent), ordinal-based (e.g., a number of occurrences of the feature in the document), or frequency-based (e.g., a number of occurrences of the feature in the document normalized by a distinct number, such as number of documents, number of features, or the like).

Once the selection module 28 provides the feature vectors for all of the available documents, regardless of whether a document was included in a corpus in the feature selection process, the learning module 30 determines the relationship between feature vectors and their associated objective descriptors. The learning module 30 uses this relationship to predict the document label (e.g., predictive descriptor) for previously unseen documents. The learning module 30 determines the relationship by providing the feature vectors into a statistical prediction or machine learning algorithm, such as a regression algorithm, support vector machine (SVM), neural net, or decision tree algorithm. In one embodiment, the learning module 30 implements one or more "boosting" or "bagging" techniques, as know in the art. The learning module 30 can also be configured to use ensemble techniques and/or combine several different machine learning algorithms. For example, in one embodiment, the learning module 30 determines the relationships, and is thereby trained, using many smaller SVMs on subsets of document feature vectors, and then allows each SVM to independently vote for the label of a document. In one embodiment, the learning module 30 uses a model tuning technique such as cross-validation to determine the optimal number of features to utilize and to tune the predictive model.

Once the learning module 30 is tuned, the prediction module 31 applies it to new documents to predict the label for new documents. The prediction can be a probability or a continuous variable (e.g., a predictive descriptor that is assigned to each new document). For example, in one embodiment, the predictive descriptor is a number between zero (0) and one (1), with zero (0) indicating a default or bankruptcy being very unlikely and one (1) indicating a default or bankruptcy being likely.

The prediction module 31 generates a company specific signal using the predictive descriptors. In one embodiment, the company signal is based on the predictive descriptors associated with one or more recently received document. In another embodiment, the company signal is based on an aggregation of predictive descriptors from documents received over a certain time period (a day, week, month, etc.). The predictive descriptors can require transformation or calibration to align correctly the historical or baseline level of default events.

Figure 2:
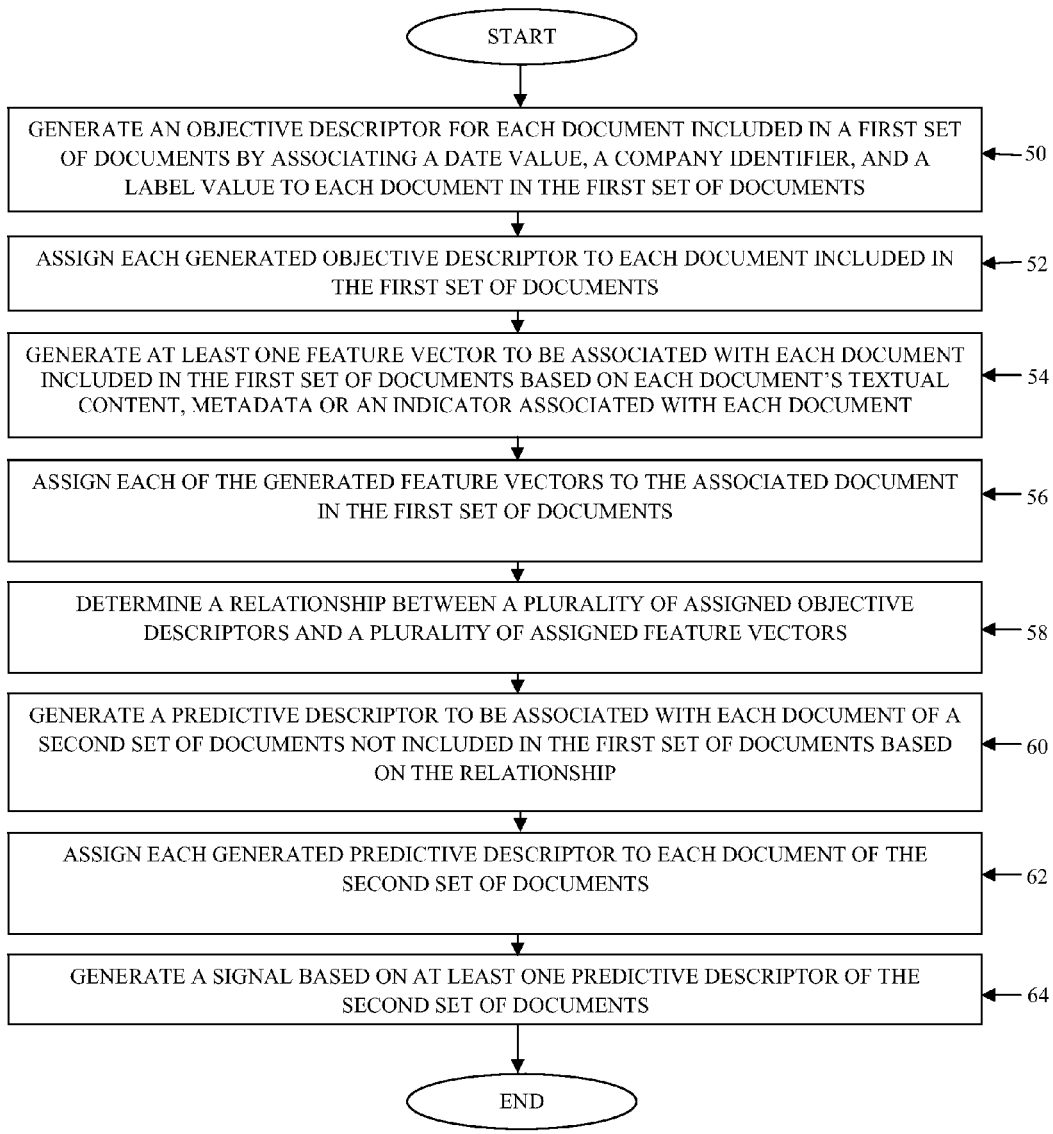
FIG. 2 illustrates an exemplary method for determining credit risk of an entity according to one embodiment of the invention.

An exemplary method of determining credit risk of a company according to one embodiment of the present invention is disclosed in FIG. 2. As shown in the FIG. 2 example, in one embodiment, the document module 24 first generates an objective descriptor for each document included in a first set of documents by associating a date value, an entity identifier, and a label value to each document 50 and then assigns each generated objective descriptor to each document included in the first set of documents 52. Next, the feature module 26 generates at least one feature vector for each document included in the first set of documents based on metadata or an indicator associated with each document 54, and then assigns each of the generated feature vectors to each document of the first set of documents 56. The learning module 30 then determines a relationship between a plurality of assigned objective descriptors and a plurality of assigned feature vectors 58. Functional steps 60, 62 and 64 of FIG. 2 will be described below.

Figure 3:
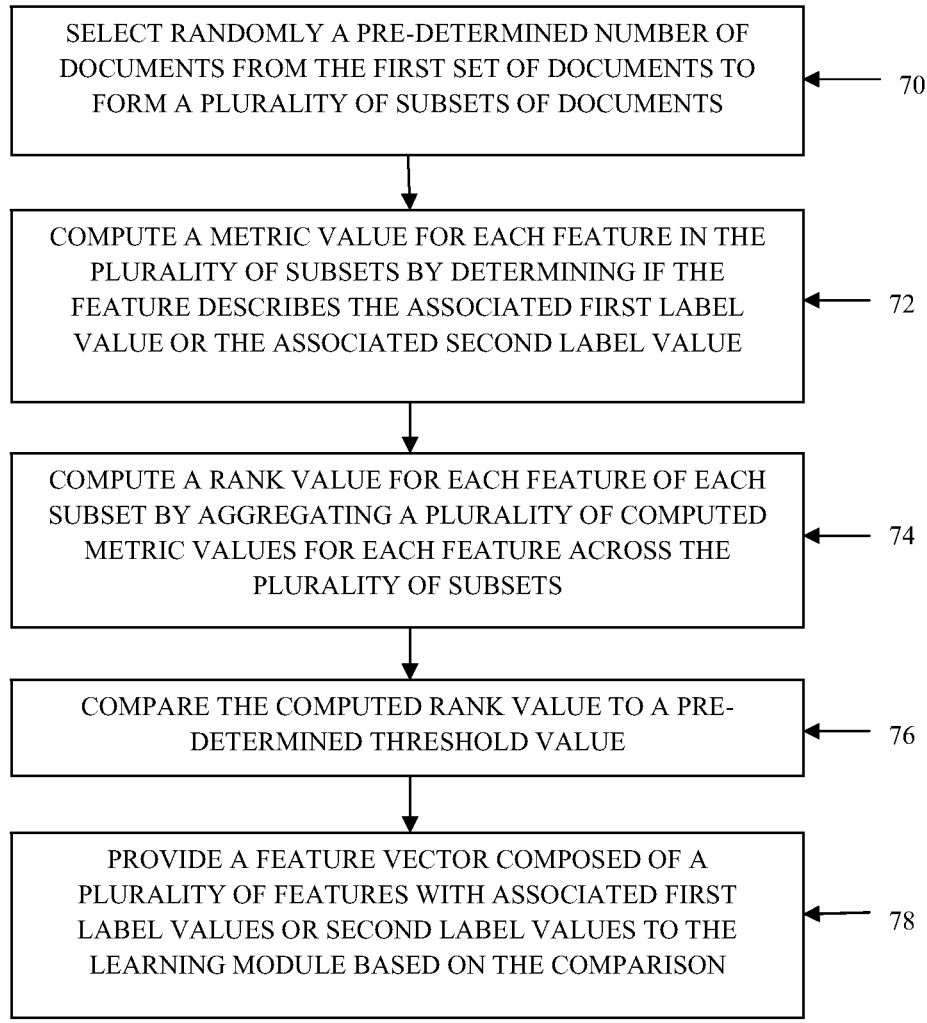
FIG. 3 illustrates an exemplary method for providing a ranked feature vector associated with a document to a machine learning algorithm according to one embodiment of the invention.

Turning to FIG. 3, exemplary steps executed by the selection module 28 in determining which feature vectors are to be provided to the learning module 30 are disclosed. As shown in the FIG. 3 example, first, the selection module 28 selects randomly a pre-determined number of documents from the first set of documents to form a plurality of subsets of documents 70. Next, the selection module 28 computes a metric value for each feature in the plurality of subsets by determining if the feature describes a first label value or a second label value associated with the document 72. The selection module 28 then computes a rank value for each feature of each subset by aggregating a plurality of computed metric values for each feature across the plurality of subsets 74.

Once the rank values are computed, the selection module 28 compares the computed rank values to one or more pre-determined threshold values 76, and provides a plurality of ranked features with associated first label values or second label values to the learning module 30 based on the comparison 78. In one embodiment, if a rank value meets or exceeds the threshold value, the feature is included in the feature vector is provided to the learning module 30.

Referring back to FIG. 2, once the learning module 30 determines the relationship using the ranked feature values, the prediction module 31 generates a predictive descriptor to be associated with each document of a second set of documents not included in the first set of documents using the relationship 60 determined by the learning module 30. The prediction module 31 then assigns each generated predictive descriptor to each document of the second set of documents 62, and generates a signal based on at least one predictive descriptor of the second set of documents 64.

The system can be configured to predict bankruptcy or defaults within business sectors. For example, in one embodiment, the system is configured to identify an entity based on properties or characteristics of other entities associated to a document. For example, a document discussing Microsoft Corporation's latest operating system could be associated with the Information Technology (IT) sector, as Microsoft Corporation is identified in the document and typically is classified in the IT sector. In one embodiment, the system constructs an objective descriptor using a sector identifier as the entity identifier and sets the label value to the presence or absence of bankruptcy or defaults within the sector in the next twelve (12) months.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method of determining credit risk of a company comprising:

assigning, using a processing device, an objective descriptor to each document included in a first set of documents, the objective descriptor based on a historical event or a quantitative metric, the objective descriptor being assigned to each document included in the first set of documents by assigning a date value, an entity identifier and a label value to each document included in the first set of documents, the date value representing a date upon which a document included in the first set of documents is first accessible, the entity identifier representing an entity associated with the document included in the first set of documents, the label value representing occurrence of the historical event, the historical event being associated with the entity;

assigning, using the processing device, at least one feature vector to each document in the first set of documents, the at least one feature vector being an N-dimensional vector of numerical features each representing identified semantic content associated with a document to which the at least one feature vector is assigned, the at least one feature vector being derived from text of the document to which the at least one feature vector is assigned, the identified semantic content comprising linguistic properties associated with the document to which the feature vector is assigned;

determining, using the processing device, a relationship between a plurality of assigned objective descriptors and a plurality of assigned feature vectors by applying the at least one feature vector to a statistical prediction algorithm;

assigning, using the processing device, a predictive descriptor to each document of a second set of documents not included in the first set of documents based on the relationship, the predictive descriptor indicative of a future event relating to at least one of a company default, company bankruptcy, loss given default, credit spread, rating agency rating change, and equity price movement;

generating, using the processing device, a signal based on at least one predictive descriptor of the second set of documents;

generating the at least one feature vector based on textual content, metadata or an indicator associated with the document included in the first set of documents;

selecting randomly a pre-determined number of documents from the first set of documents to form a plurality of subsets of documents, each document in the plurality of subsets including the at least one feature vector and an associated first label value or an associated second label value different from the first label value;

computing a metric value for each feature of the at least one feature vector by determining if the feature describes the associated first label value or the associated second label value; and computing a rank value for each feature of each subset of documents by aggregating a plurality of computed metric values for each feature across the plurality of subsets of documents.

2. The method of claim 1, further comprising aggregating a plurality of documents to form at least one document of the first set of documents.

3. The method of claim 2, wherein aggregating the plurality of documents comprises comparing a plurality of date values associated with the plurality of documents to a predetermined time period.

4. The method of claim 1, comprising assigning the at least one feature vector to a group of documents in the first set of documents.

5. The method of claim 1, wherein the quantitative metric is one of a sentiment rating, a tone rating, a corporate event indicator, a linguistic analysis indicator, a statistical analysis indicator, and combination thereof.

6. The method of claim 1, wherein the label value is indicative of the historical event or the quantitative metric.

7. The method of claim 1, wherein associating the date value comprises determining a time period in which the document included in the first set of documents is first accessible.

8. The method of claim 1, further comprising associating a plurality of label values to at least one document of the first set of documents.

9. The method of claim 1, wherein the label value is indicative of a plurality of historical events or a plurality of quantitative metrics.

10. The method of claim 1, further comprising:
determining whether a plurality of entities are identified in a document of the first set of documents; and
assigning a plurality of objective identifiers to the document based on the determination,
wherein each of the plurality of objective identifiers corresponds to one of the plurality of entities, and a label of the document is modifiable as a function of 1) either the historical event or the quantitative metric corresponding to the one entity and 2) a relevancy score of the document corresponding to the one entity.

11. The method of claim 1, wherein generating the at least one feature vector comprises parsing the document included in the first set of documents into a set of words or phrases.

12. The method of claim 11, further comprising removing a pre-identified word from the set of words or phrases prior to generating the at least one feature vector.

13. The method of claim 11, further comprising stemming one or more words included in the set of words or phrases using a stemming algorithm prior to generating the at least one feature vector.

14. The method of claim 13, wherein the stemming algorithm is a Porter stemmer.

15. The method of claim 1, further comprising:
comparing the computed rank value to a pre-determined threshold value; and
based on the comparison, providing a feature vector comprising a plurality of ranked features with associated first label values or second label values to a machine learning module to determine the relationship.

16. The method of claim of claim 15, wherein the machine learning module uses one of a regression algorithm, support vector machine (SVM), neural net, or decision tree algorithm.

17. The method of claim 15, further comprising cross-validating the determined relationship across the plurality of subsets to determine an optimal number of feature vectors to provide to the machine learning module by assessing how the determined relationship is optimally fit to the plurality of subsets of documents.

18. The method of claim 17, further comprising generating the predictive descriptor for each document of the second set of documents using the machine learning module.

19. The method of claim 18, wherein the predictive descriptor is based on a most recently received document or an aggregation of documents received over a pre-determined time interval.

* * * * *